(12) United States Patent
Yeh et al.

(10) Patent No.: US 12,176,800 B2
(45) Date of Patent: Dec. 24, 2024

(54) CURRENT GENERATOR WITH REDUCED POWER CONSUMPTION

(71) Applicant: UNITED MICROELECTRONICS CORP., Hsin-Chu (TW)

(72) Inventors: Hsiu-Ming Yeh, Hsinchu (TW); Min-Chia Wang, New Taipei (TW)

(73) Assignee: UNITED MICROELECTRONICS CORP., Hsin-Chu (TW)

(*) Notice: Subject to any disclaimer, the term of this patent is extended or adjusted under 35 U.S.C. 154(b) by 224 days.

(21) Appl. No.: 18/081,706

(22) Filed: Dec. 15, 2022

(65) Prior Publication Data
US 2024/0154512 A1    May 9, 2024

(30) Foreign Application Priority Data
Nov. 3, 2022   (TW) ................... 111142010

(51) Int. Cl.
*H02M 1/00* (2007.01)
*H02M 3/155* (2006.01)

(52) U.S. Cl.
CPC ......... *H02M 1/0003* (2021.05); *H02M 3/155* (2013.01)

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465

See application file for complete search history.

(56) References Cited

U.S. PATENT DOCUMENTS

| | | | |
|---|---|---|---|
| 6,600,379 B2 | 7/2003 | Anderson | |
| 7,944,281 B2 | 5/2011 | Yu | |
| 8,106,644 B2* | 1/2012 | Kalyanaraman | .......... G05F 3/30 323/901 |
| 8,633,736 B2 | 1/2014 | Illegems | |
| 9,235,229 B2* | 1/2016 | Zhang | ........................ G05F 3/30 |
| 11,868,152 B2* | 1/2024 | Lee | ........................... G05F 3/30 |
| 11,892,865 B2* | 2/2024 | Wu | .......................... H03M 1/66 |
| 2023/0142312 A1* | 5/2023 | Chen | ....................... G05F 1/468 323/313 |

* cited by examiner

*Primary Examiner* — Jeffrey A Gblende
(74) *Attorney, Agent, or Firm* — Winston Hsu (57) ABSTRACT

A current generator includes a startup circuit and a bandgap reference circuit coupled to the startup circuit. The startup circuit is for generating a first voltage. The bandgap reference circuit is for generating a second voltage. The bandgap reference circuit includes an operational amplifier. The operational amplifier includes a bias source circuit and a bias generator circuit. The bias source circuit is for generating a reference current according to the first voltage and the second voltage. The bias generator circuit is for generating bias voltages according to the reference current. The startup circuit and the bandgap reference circuit receive a supply voltage.

20 Claims, 5 Drawing Sheets

CURRENT GENERATOR WITH REDUCED POWER CONSUMPTION

BACKGROUND OF THE INVENTION

1. Field of the Invention

The present invention is related to a current generator, and more particularly to a current generator with reduced power consumption.

2. Description of the Prior Art

Temperature affects electronic components such as diodes, resistors, capacitors and transistors in various degrees. Mixed-signal circuits require high-speed, low-voltage, and high-complexity design, which usually result in uneven internal power densities in the chip. This often greatly increases the temperature gradient of the chip, so engineers must consider the impact of temperature gradient on the entire chip. Analog circuits are particularly sensitive to temperature variation. In order to avoid performance deterioration, the wiring of analog circuits must strictly follow the symmetrical principle to create proper temperature distribution.

In analog circuit design, a steady reference voltage not affected by the supply voltage and temperature variation is often required to improve the yield, reliability and accuracy of the circuit. Thus, the bandgap reference circuit, which provides a reference voltage and a steady current to monitor the accuracy of power supply or other circuit operation, is often implemented in analog circuit designs. Ideally, the voltage generated by the bandgap reference circuit should not be affected by the temperature. The bandgap reference voltage is a voltage that decreases with temperature (complementary to absolute temperature, CTAT) plus a voltage that increases with the temperature (proportional to absolute temperature, PTAT). The CTAT voltage is generated by tapping the base-emitter of a forward-biased bipolar junction transistor (BJT), while the PTAT voltage is generated from the base-emitter voltage (Vbe) of two bipolar junction transistors. In analog integrated circuits bandgap reference circuits with low correlation with power supply, temperature and process parameters are widely implemented to provide reference voltages for other functional circuits. For example, the output voltage level of the regulator can be determined by the reference voltage.

The conventional bandgap reference circuit design includes an operational amplifier, and the operational amplifier usually includes a differential input stage, a gain stage, an output stage, and a bias circuit that provide reference currents for each stage. The bias circuit usually includes a resistive load as the bias source. However, the resistive load can become a major source of power consumption in the bandgap reference circuit.

Figure 4:
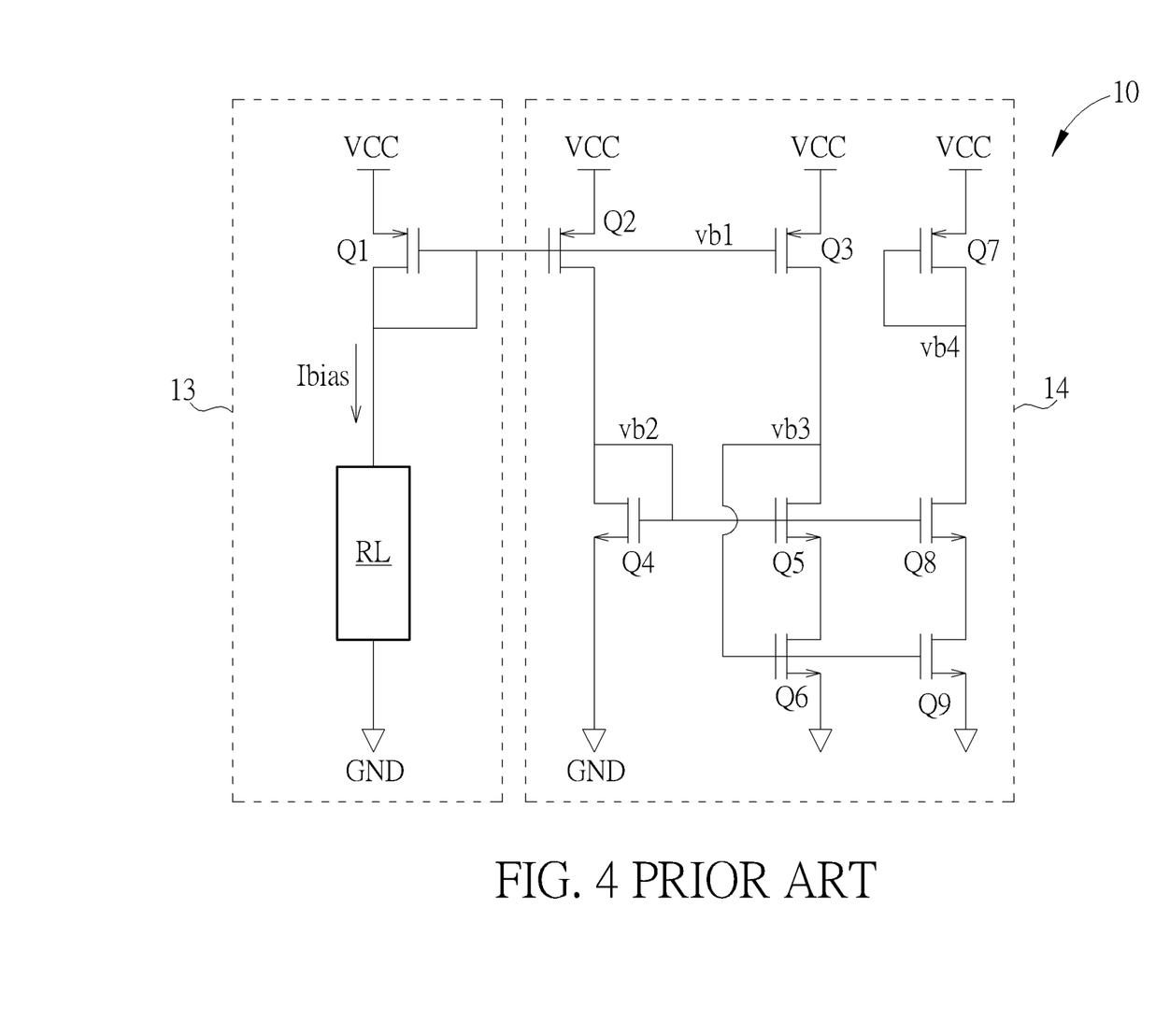
FIG. 4 is a diagram of a portion of a conventional operational amplifier.

FIG. 4 is a diagram of a portion of a conventional operational amplifier 10. The operational amplifier 10 includes a bias source circuit 13 and a bias generator circuit 14. The bias source circuit 13 includes a transistor Q1 and a resistive load RL. The bias generator circuit 14 includes transistors Q2, Q3, Q4, Q5, Q6, Q7, Q8 and Q9. The transistor Q1 includes a source for receiving a supply voltage VCC, a drain, and a gate coupled to the drain of the transistor Q1. The resistive load RL may be coupled between the drain of the transistor Q1 and the ground terminal GND. The transistor Q2 includes a source for receiving the supply voltage VCC, a drain, and a gate coupled to the gate of the transistor Q1. The transistor Q3 includes a source for receiving the supply voltage VCC, a drain, and a gate coupled to the gate of the transistor Q1. The transistor Q4 includes a drain coupled to the drain of the transistor Q2, a source coupled to the ground terminal GND, and a gate coupled to the drain of the transistor Q4. The transistor Q5 includes a drain coupled to the drain of the transistor Q3, and a source coupled to the gate of the transistor Q4. The transistor Q6 includes a drain coupled to the source of the transistor Q5, a source coupled to the ground terminal GND, and a gate coupled to the drain of the transistor Q5. The transistor Q7 includes a source for receiving the supply voltage VCC, a drain, and a gate coupled to the drain of the transistor Q7. The transistor Q8 includes a drain coupled to the drain of the transistor Q7, and a source coupled to the gate of the transistor Q5. The transistor Q9 includes a drain coupled to the source of the transistor Q8, a source coupled to the ground terminal GND, and a gate coupled to the gate of the transistor Q6. The transistors Q1, Q2, Q3 and Q7 are P-type MOSFETs. The transistors Q4, Q5, Q6, Q8 and Q9 are N-type MOSFETs. When the transistor Q1 is turned on, it can generate a bias current Ibias to flow through the resistive load RL to start up the bias generator circuit 14. Then, the operational amplifier 10 can be powered up. The operation is described in detail as follows.

Figure 5:
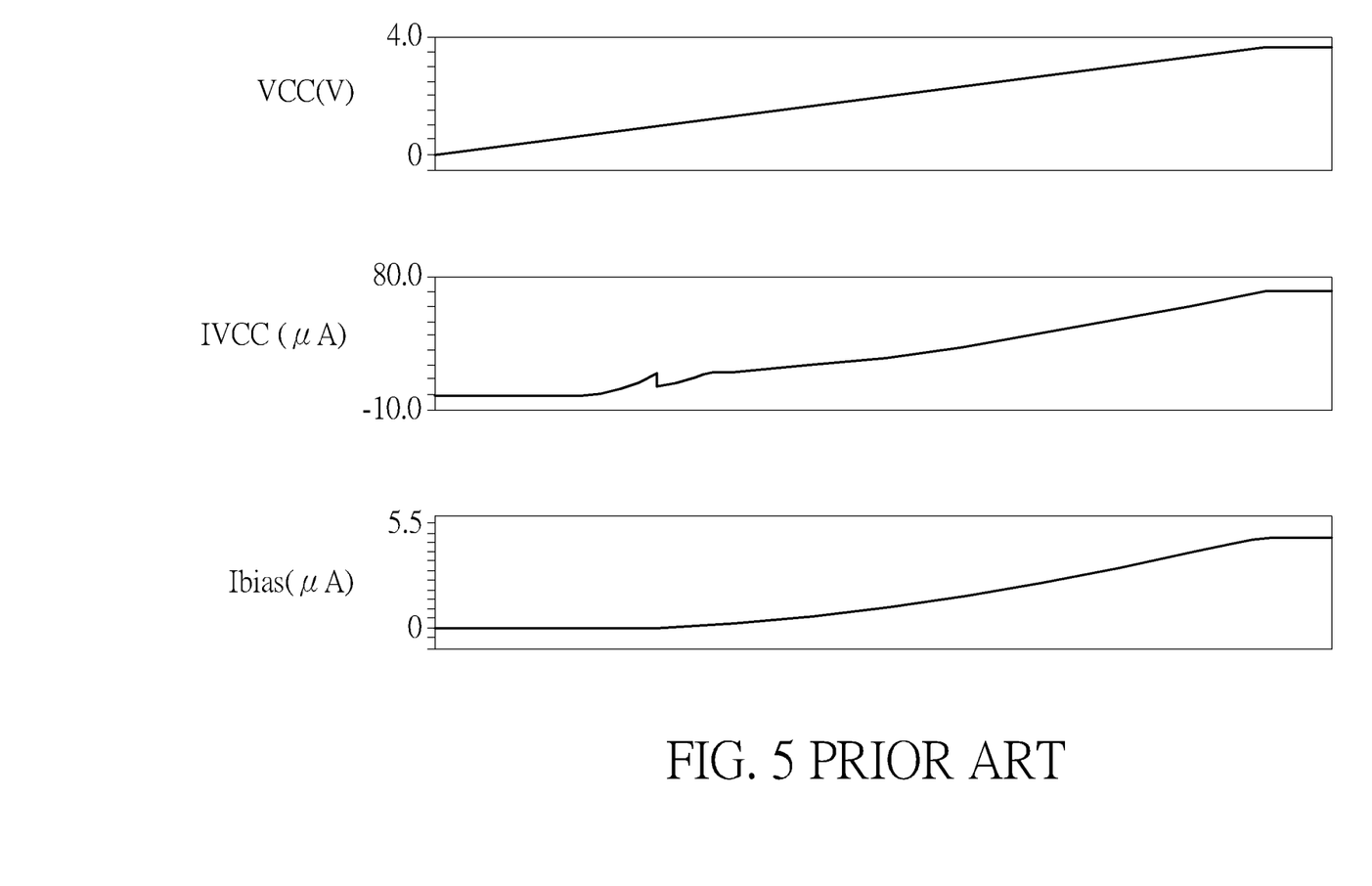
FIG. 5 is an operation signal diagram of the conventional operational amplifier in FIG. 4.

FIG. 5 is an operation signal diagram of the conventional operational amplifier 10 in FIG. 4. The supply voltage VCC rises with a slope from 0V. The transistor Q1 is turned on and generates the bias current Ibias. When the bias current Ibias rises to a sufficient level, the bias voltages vb1-vb4 generated by the bias generator circuit 14 can power up the operational amplifier 10. After the operational amplifier 10 is powered up, the transistor Q1 continues to turned on and continues to supply the bias current Ibias, and the bias current Ibias also continues to rise. If the operational amplifier 10 is integrated into a general bandgap reference circuit, the total current IVCC consumed by the bandgap reference circuit will continue to rise as shown in FIG. 5, thereby causing unnecessary current variation and power consumption.

SUMMARY OF THE INVENTION

The embodiment provides a current generator. The current generator includes a startup circuit and a bandgap reference circuit coupled to the startup circuit. The startup circuit is for generating a first voltage. The bandgap reference circuit is for generating a second voltage. The bandgap reference circuit includes an operational amplifier. The operational amplifier includes a bias source circuit and a bias generator circuit. The bias source circuit is for generating a reference current according to the first voltage and the second voltage. The bias generator circuit is for generating bias voltages according to the reference current. The startup circuit and the bandgap reference circuit receive a supply voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
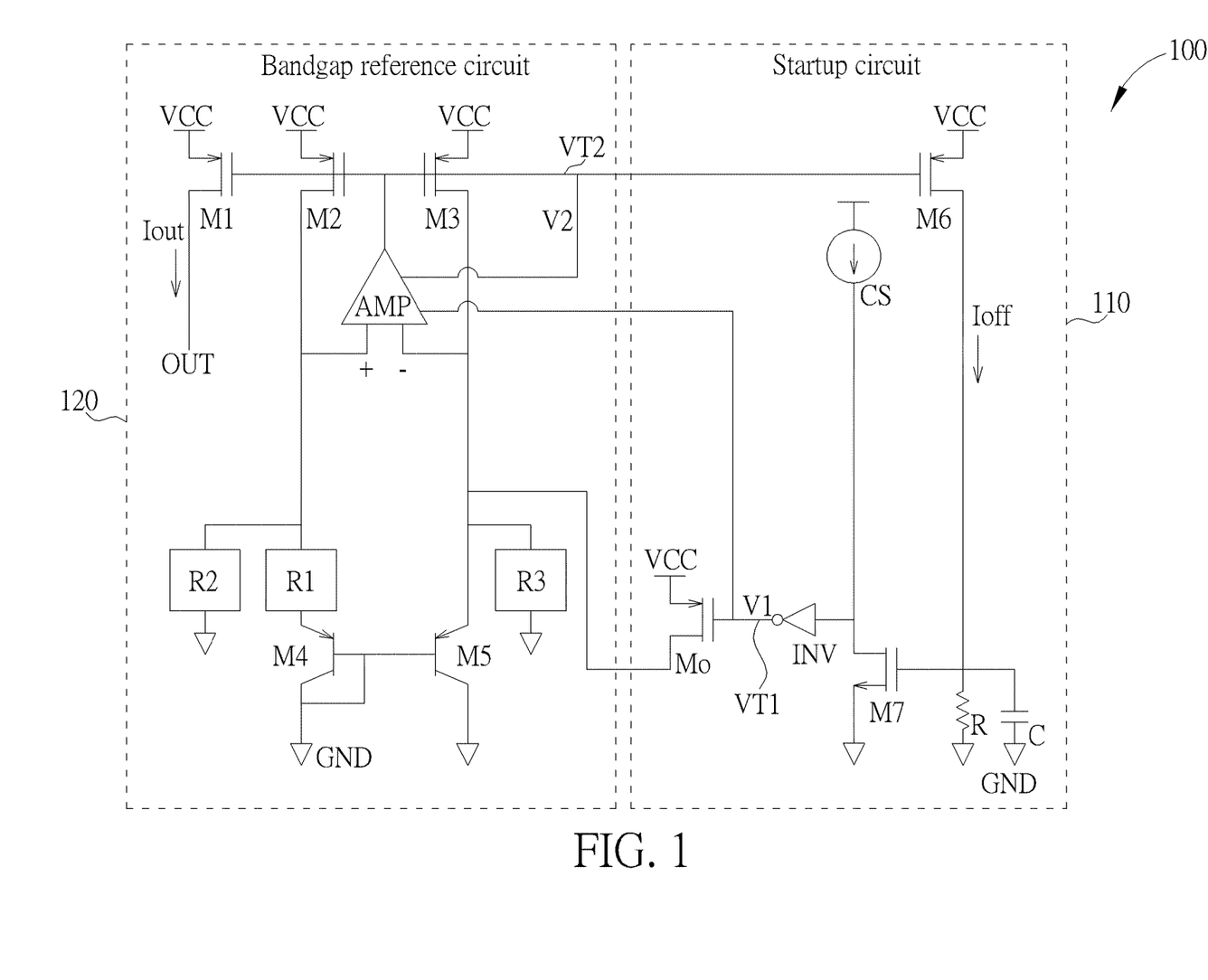
FIG. 1 is a diagram of a current generator of an embodiment of the present invention.

FIG. 1 is a diagram of a current generator 100 of an embodiment of the present invention. The current generator 100 includes a startup circuit 110 and a bandgap reference circuit 120. The bandgap reference circuit 120 is coupled to the startup circuit 110. The bandgap reference circuit 120 includes an operational amplifier AMP, and the operational amplifier AMP receives the first voltage V1 and the second voltage V2.

The bandgap reference circuit 120 outputs a bandgap reference voltage that is affected by the temperature. The bandgap reference voltage is a voltage that decreases with temperature (complementary to absolute temperature, CTAT) plus a voltage that increases with the temperature (proportional to absolute temperature, PTAT). The bandgap reference circuit 120 includes an operational amplifier AMP, transistors M1, M2, M3, M4 and M5, and resistive loads R1, R2 and R3. The transistors M1, M2 and M3 are P-type transistors, such as P-type MOSFETs. The transistors M4 and M5 are PNP bipolar junction transistors. The transistor M1 may include a source for receiving a supply voltage VCC, a drain coupled to the output terminal OUT, and a gate coupled to the second voltage terminal VT2. The transistor M2 may include a source for receiving the supply voltage VCC, a drain, and a gate coupled to the second voltage terminal VT2. The transistor M3 may include a source for receiving the supply voltage VCC, a drain, and a gate coupled to the second voltage terminal VT2. The transistor M4 may include an emitter, a collector coupled to the ground terminal GND, and a base coupled to the collector of the transistor M4. The transistor M5 may include an emitter coupled to the drain of the transistor M3, a collector coupled to the ground terminal GND, and a base coupled to the gate of the transistor M4. The resistive load R1 may be coupled between the drain of the transistor M2 and the emitter of the transistor M4. The resistive load R2 may be coupled between the drain of the transistor M2 and the ground terminal GND. The resistive load R3 may be coupled between the drain of the transistor M3 and the ground terminal GND. The operational amplifier AMP may include a non-inverting input terminal coupled to the drain of the transistor M2, an inverting input terminal coupled to the drain of the transistor M3, and an output terminal coupled to the second voltage terminal VT2. During the operation, the operational amplifier AMP is virtual short. That is, the voltages at the non-inverting input terminal and the inverting input terminal are substantially equal. In circuit configuration, the resistance of the resistive load R2 can be chosen to be substantially equal to the resistance of the resistive load R3, so that the currents flowing through the transistor M4 and the transistor M5 can be substantially equal to generate the CTAT voltage and PTAT voltage.

The startup circuit 110 may include an output transistor Mo, transistors M6 and M7, a current source CS, an inverter INV, a capacitor C and a resistor R. The output transistor Mo may include a source for receiving the supply voltage VCC, a drain coupled to the drain of the transistor M3, and a gate coupled to the first voltage terminal VT1. The transistor M6 may include a source for receiving the supply voltage VCC, a drain, and a gate coupled to the second voltage terminal VT2. The transistor M7 may include a drain, a source coupled to the ground terminal GND, and a gate. The current source CS may include a first terminal for receiving the supply voltage VCC, and a second terminal coupled to the drain of the transistor M7. The inverter INV may include an input terminal coupled to the second terminal of the current source CS, and an output terminal coupled to the first voltage terminal VT1. The capacitor C may be coupled between the drain of the transistor M6 and the ground terminal GND. The resistor R may be coupled in parallel with the capacitor C between the drain of the transistor M6 and the ground terminal GND. A first voltage V1 can be measured from the first voltage terminal VT1, and a second voltage V2 can be measured from the second voltage terminal VT2. The transistors Mo and M6 are P-type transistors, such as P-type MOSFETs. The transistor M7 is an N-type transistor, such as an N-type MOSFET.

Figure 2:
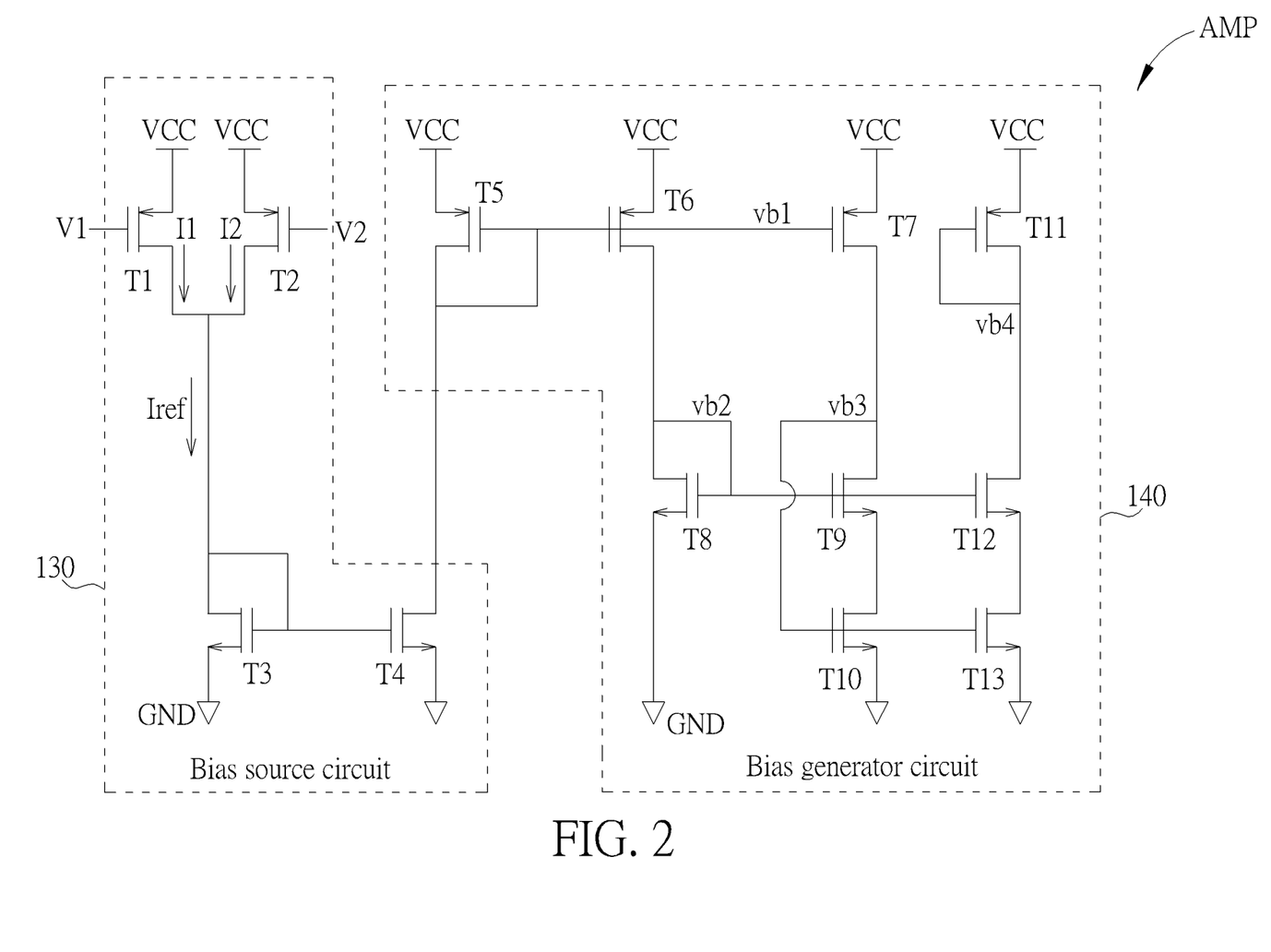
FIG. 2 is a diagram of a portion of the operational amplifier in the current generator of FIG. 1.

FIG. 2 is a diagram of the relevant portion of the operational amplifier AMP in the current generator 100 of FIG. 1. The operational amplifier AMP may include a bias source circuit 130 and a bias generator circuit 140. The bias source circuit 130 may include transistors T1, T2, T3 and T4. The transistor T1 may include a source for receiving the supply voltage VCC, a drain, and a gate for receiving the first voltage V1. The transistor T2 may include a source for receiving the supply voltage VCC, a drain coupled to the drain of the transistor T1, and a gate for receiving the second voltage V2. The transistor T3 may include a drain coupled to the drain of the transistor T1 and the drain of the transistor T2, a source coupled to the ground terminal GND, and a gate coupled to the drain of the transistor T3. The transistor T4 may include a drain, a source coupled to the ground terminal GND, and a gate coupled to the gate of the transistor T3. The transistors T1 and T2 can be P-type MOSFETs. The transistors T3 and T4 can be N-type MOSFETs.

The bias generator circuit 140 may include transistors T5, T6, T7, T8, T9, T10, T11, T12 and T13. The transistor T5 may include a source for receiving the supply voltage VCC, a drain coupled to the drain of the transistor T4, and a gate coupled to the drain of the transistor T5. The transistor T6 may include a source for receiving the supply voltage VCC, a drain, and a gate coupled to the gate of the transistor T5. The transistor T7 may include a source for receiving the supply voltage VCC, a drain, and a gate coupled to the gate of the transistor T5. The transistor T8 may include a drain coupled to the drain of the transistor T6, a source coupled to the ground terminal GND, and a gate coupled to the drain of the transistor T8. The transistor T9 may include a drain coupled to the drain of the transistor T7, a source coupled to the gate of the transistor T8. The transistor T10 may include a drain coupled to the source of the transistor T9, a source coupled to the ground terminal GND, and a gate coupled to the drain of the transistor T9. The transistor T11 may include a source for receiving the supply voltage VCC, a drain, and a gate coupled to the drain of the transistor T11. The transistor T12 may include a drain coupled to the drain of the transistor T11, a source coupled to the gate of the transistor T9 and a gate. The transistor T13 may include a drain coupled to the source of the transistor T12, a source coupled to the ground terminal GND, and a gate coupled to the gate of the transistor T10. The transistors T5, T6, T7 and T11 are P-type transistors, such as P-type MOSFETs. The transistors T8, T9, T10, T12 and T13 are N-type transistors, such as N-type MOSFETs.

The transistor T1 generates the first current I1 according to the supply voltage VCC and the first voltage V1. The transistor T2 generates the second current I2 according to the power supply voltage VCC and the second voltage V2. The sum of the output current at the drain of the transistor and the transistor T2 is the reference current Iref. The reference current Iref can be mirrored to the current paths of the transistors T5, T6, T7, and T12 by the current mirrors, thereby generating the bias voltages vb1, vb2, vb3, and vb4 in the bias generator circuit 140 to drive the operational amplifier AMP. This circuit structure can make the bias voltages vb1-vb4 generated by the bias generator circuit 140 more stable. That means making the DC operating point of the bias generator circuit 140 more stable.

Figure 3:
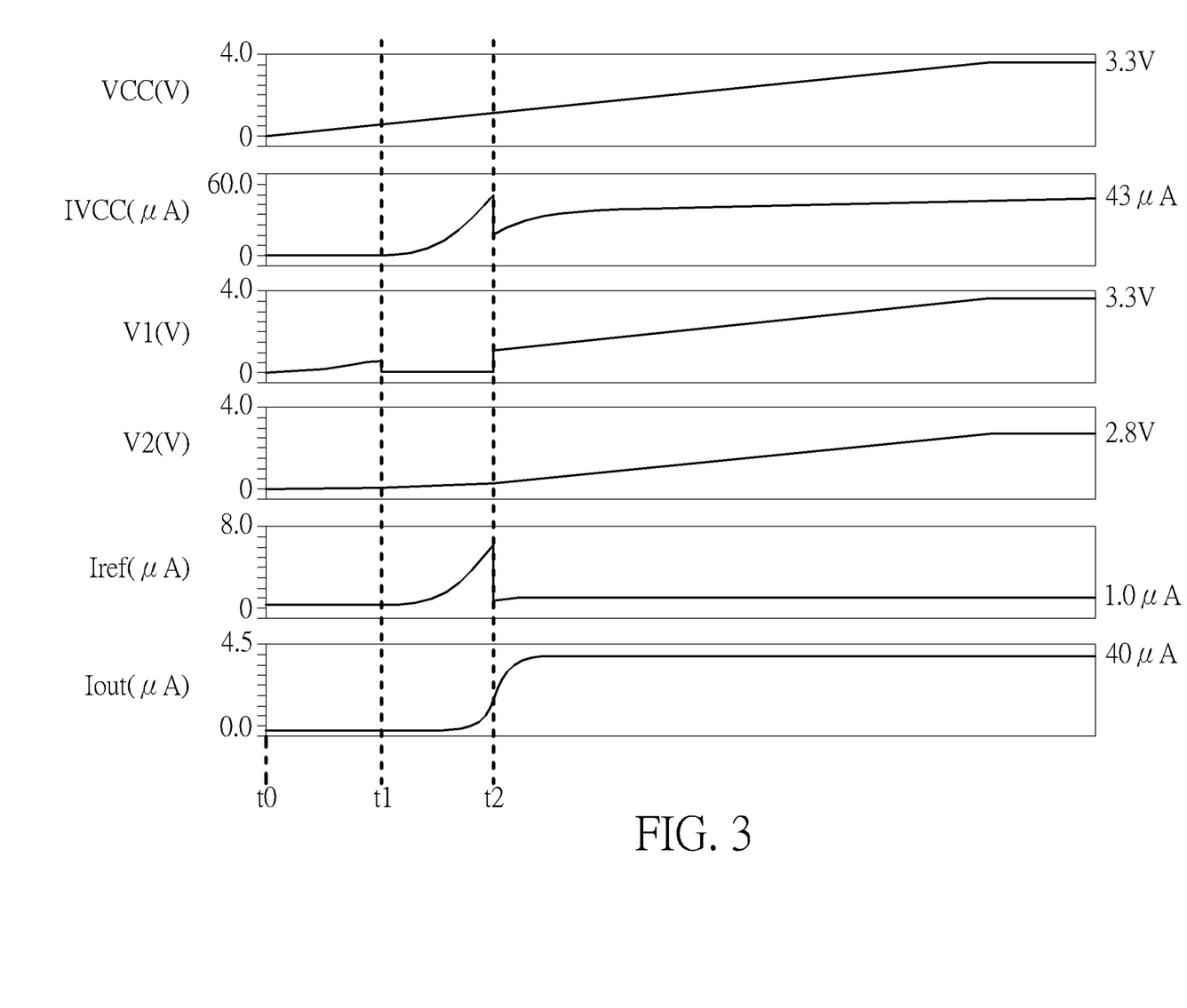
FIG. 3 is an operation signal diagram of the current generator in FIG. 1 and the operational amplifier in FIG. 2.

FIG. 3 is an operation signal diagram of the current generator 100 in FIG. 1 and the operational amplifier AMP in FIG. 2. Please refer to both FIGS. 1 and 2. At the time t0, the supply voltage VCC rises from 0V with a slope. The gate-source voltage (VGS) of the output transistor Mo in the startup circuit 110 has a fixed voltage differential. The first voltage V1 based on the supply voltage VCC begins to rise with a slope, so that the output transistor Mo maintains steady current output.

At time t1, the current source CS is turned on, so that the voltage at the drain of the transistor M7 rises to high level. The drain of the transistor M7 may be coupled to the inverter INV so the inverter INV makes the first voltage V1 at the first voltage terminal VT1 drops to low level and turns on the output transistor Mo to gradually pull up the voltage of the inverting input terminal of the operational amplifier AMP. When the first voltage V1 drops to low level, the transistor T1 of the bias source circuit 130 is turned on to generate the first current I1. Because the transistor T2 is not yet turned on, the reference current Iref at this time is equivalent to the first current I1. The sum of the current of all paths in the current generator 100 is called the total current IVCC. As shown in FIG. 3, the total current IVCC begins to rise at this time.

The reference current Iref of the bias source circuit 130 can be mirrored to the current path of the transistors T5, T6, T7 and T12 to generate bias voltages vb1, vb2, vb3 and vb4. Between time t1 and t2, when the reference current Iref rises to a sufficient level, the bias generator circuit 140 can generate stable bias voltages vb1-vb4. The second voltage V2 turns on the transistor T2 during time t1 to t2 to generate the second current I2. In circuit design, the size of the transistor T2 may be different from that of the transistor T1, so the second current I2 may be less than the first current I1. The first current I1 increases with the increase of the supply voltage VCC, and the reference current Iref increases simultaneously with the increase of the first current I1. Also at this time period, the voltage output by the operational amplifier AMP turns on the transistor M1 to generate an output current Iout. At the same time, the transistor M6 is turned on, and the cutoff current Ioff of the startup circuit 110 starts to charge the capacitor C, resulting in rising of the gate voltage of the transistor M7.

At time t2, the gate voltage of the transistor M7 rises to a level above the threshold voltage. The transistor M7 is turned on, so that the drain voltage of the transistor M7 drops to low level. The inverter INV further makes the first voltage V1 to reach the same level as the supply voltage VCC. At this time, the first voltage V1 turns off the transistor T1 of the bias source circuit 130. The transistor T1 would stop supplying the first current I1, and the reference current Iref drops to be equivalent to the second current I2. The second voltage V2 can continue to rise. The gate-source voltage (VGS) of the transistors M1, M2, M3, and M6 remains unchanged, so that these transistors can maintain steady current output. The gate-source voltage of the transistor T2 can also remain unchanged, so that the second current I2, which equals the reference current Iref at this time, may be steady. The output current Iout would also gradually become steady as shown in FIG. 3.

During the operation of the current generator 100, the supply voltage VCC can continuously rise to the power supply saturation level, such as 3.3V. The first voltage V1 rises to reach the first saturation level (i.e., 3.3V) along with the supply voltage VCC. The second voltage V2 also rises to reach the second saturation level (i.e., 2.8V). At this point, the current generator 100 enters the steady-state. The total current IVCC at the steady state is about 43 μA.

Table 1 is a comparison of the current in the current generator implemented with the conventional operational amplifier 10 and with the operational amplifier AMP of the embodiment of the present invention. Table 1 also presents the computer simulation of the current of the bandgap reference circuit and the operational amplifier with different supply voltages VCC.

TABLE 1

(simulation of current in the current generator)

| VCC | | Conventional operational amplifier 10 (μA) | Operational amplifier AMP (μA) |
|---|---|---|---|
| 2.5 V | Bandgap reference circuit | 14.1 | 19 |
| | Operational amplifier | 26.7 | 19.9 |
| 3.3 V | Bandgap reference circuit | 14.1 | 22.4 |
| | Operational amplifier | 50.7 | 20.6 |
| 3.63 V | Bandgap reference circuit | 14.1 | 24 |
| | Operational amplifier | 61.4 | 20.9 |

In Table 1, the current in the operational amplifier is separately presented. Although the bandgap reference circuit 120 in FIG. 1 includes an operational amplifier, the current of the bandgap reference circuit presented in Table 1 does not include the operational amplifier. For easy comparison, both the operational amplifier 10 and the operational amplifier AMP may be designed with the same bandgap reference circuit (i.e., the bandgap reference circuit 120). In other words, the configurations of other circuit elements, except the operational amplifier, may be identical.

In an example, when the supply voltage VCC is 2.5V, in the current generator designed with the conventional operational amplifier 10, the current in the bandgap reference circuit is 14.1 μA, and the current in the operational amplifier 10 is 26.7 μA. The total current is 40.8 μA. In the current generator 100 designed with the operational amplifier AMP of the embodiment, the current in the bandgap reference circuit 120 is 19 μA, and the current in the operational amplifier AMP is 19.9 μA. The total current is 38.9 μA.

In another example, when the supply voltage VCC is 3.3V, in the current generator designed with the conventional operational amplifier 10, the current in the bandgap reference circuit is 14.1 μA, and the current in the operational amplifier 10 is 50.7 μA; the total current is 64.8 μA. In the current generator designed with the operational ampli- <!-- Note: VCC 2.5V row also shows 40.8 total in conventional column --> fier AMP of the embodiment, the current in the bandgap reference circuit 120 is 22.4 µA, and the current in the operational amplifier AMP is 20.6 µA. The total current amount is 43 µA.

In another example, when the supply voltage VCC is 3.63V, in the current generator designed with the conventional operational amplifier 10, the current in the bandgap reference circuit is 14.1 µA, and the current in the operational amplifier 10 is 61.4 µA. The total current is 75.5 µA. In the current generator designed with the operational amplifier AMP of the embodiment, the current in the bandgap reference circuit 120 is 24 µA, and the current in the operational amplifier AMP is 20.9 µA. The total current amount is 44.9 µA.

In summary, the current generator of the embodiment of the present invention can effectively reduce the current variation and the total current required for operation, thereby reducing the power consumption. Therefore, the current generator of the embodiment is more readily implemented in mobile devices to reduce power consumption and heat generation, so as to prolong the life of circuits and batteries of the mobile devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current generator comprising:
   a startup circuit configured to generate a first voltage; and
   a bandgap reference circuit coupled to the startup circuit, configured to generate a second voltage, the bandgap reference circuit comprising an operational amplifier, and the operational amplifier comprising:
      a bias source circuit configured to generate a reference current according to the first voltage and the second voltage; and
      a bias generator circuit configured to generate bias voltages according to the reference current;
   wherein the startup circuit and the bandgap reference circuit receive a supply voltage.

2. The current generator of claim 1, wherein the startup circuit comprises an output transistor, and the output transistor comprises a gate coupled to a first voltage terminal and configured to receive the first voltage.

3. The current generator of claim 2, wherein the operational amplifier further comprises an output terminal coupled to a second voltage terminal and configured to output the second voltage.

4. The current generator of claim 3, wherein the first voltage drops to low level to turn on the output transistor, and when the output transistor is turned on, the first voltage continues to maintain the low level.

5. The current generator of claim 4, wherein after the output transistor is turned off, the first voltage continues to rise to a first saturation level.

6. The current generator of claim 3, wherein after the current generator is activated, the second voltage continues to rise to a second saturation level.

7. The current generator of claim 3, wherein after the current generator is activated, the supply voltage continues to rise to a supply saturation level.

8. The current generator of claim 3, wherein the bandgap reference circuit further comprises:
   a first transistor comprising:
      a source configured to receive the supply voltage;
      a drain; and
      a gate coupled to the second voltage terminal;
   a second transistor comprising:
      a source configured to receive the supply voltage;
      a drain; and
      a gate coupled to the second voltage terminal; and
   a third transistor comprising:
      a source configured to receive the supply voltage;
      a drain; and
      a gate coupled to the second voltage terminal;
   wherein the first transistor, the second transistor and the third transistor are P-type transistors.

9. The current generator of claim 8, wherein the bandgap reference circuit further comprises:
   a fourth transistor comprising:
      an emitter;
      a collector coupled to a ground terminal; and
      a base coupled to the collector of the fourth transistor; and
   a fifth transistor comprising:
      an emitter coupled to the drain of the third transistor;
      a collector coupled to the ground terminal; and
      a base coupled to the base of the fourth transistor;
   wherein the fourth transistor and the fifth transistor are PNP bipolar junction transistors.

10. The current generator of claim 9, wherein the bandgap reference circuit further comprises:
    a first resistive load coupled between the drain of the second transistor and the emitter of the fourth transistor;
    a second resistive load coupled between the drain of the second transistor and the ground terminal; and
    a third resistive load coupled between the drain of the third transistor and the ground terminal;
    wherein a resistance of the second resistive load is substantially equal to a resistance of the third resistive load.

11. The current generator of claim 10, wherein the operational amplifier further comprises:
    a non-inverting input terminal coupled to the drain of the second transistor; and
    an inverting input terminal coupled to the drain of the third transistor.

12. The current generator of claim 3, wherein the startup circuit further comprises:
    a sixth transistor comprising:
       a source configured to receive the supply voltage;
       a drain; and
       a gate coupled to the second voltage terminal;
    a seventh transistor comprising:
       a drain;
       a source coupled to a ground terminal; and
       a gate;
    a current source comprising:
       a first terminal configured to receive the supply voltage; and
       a second terminal coupled to the drain of the seventh transistor; and
    an inverter comprising:
       an input terminal coupled to the second terminal of the current source; and
       an output terminal coupled to the first voltage terminal;
    wherein the first voltage is measured at the first voltage terminal and the second voltage is measured at the second voltage terminal, and the sixth transistor and the seventh transistor are P-type transistors.

13. The current generator of claim 12, wherein the startup circuit further comprises:
a capacitor coupled between the drain of the sixth transistor and the ground terminal; and
a resistor coupled between the drain of the sixth transistor and the ground terminal.

14. The current generator of claim 1, wherein the bias source circuit comprises:
an eighth transistor comprising:
a source configured to receive the supply voltage;
a drain; and
a gate configured to receive the first voltage;
a ninth transistor comprising:
a source configured to receive the supply voltage;
a drain coupled to the drain of the eighth transistor; and
a gate configured to receive the second voltage;
a tenth transistor comprising:
a drain coupled to the drain of the eighth transistor and the drain of the ninth transistor;
a source coupled to a ground terminal; and
a gate coupled to the drain of the tenth transistor; and
an eleventh transistor comprising:
a drain;
a source coupled to the ground terminal; and
a gate coupled to the gate of the tenth transistor.

15. The current generator of claim 14, wherein the eighth transistor and the ninth transistor are P-type transistors, and the tenth transistor and the eleventh transistor are N-type transistors.

16. The current generator of claim 14, wherein the reference current is the sum of output current from the drain of the eighth transistor and from the drain of the ninth transistor.

17. The current generator of claim 1, wherein the bias generator circuit comprises:
a twelfth transistor comprising:
a source configured to receive the supply voltage;
a drain coupled to the drain of the eleventh transistor; and
a gate coupled to the drain of the twelfth transistor;
a thirteenth transistor comprising:
a source configured to receive the supply voltage;
a drain; and
a gate coupled to the gate of the twelfth transistor;
a fourteenth transistor comprising:
a source configured to receive the supply voltage;
a drain; and
a gate coupled to the gate of the twelfth transistor;
a fifteenth transistor comprising:
a drain coupled to the drain of the thirteenth transistor;
a source coupled to a ground terminal; and
a gate coupled to the drain of the fifteenth transistor;
a sixteenth transistor comprising:
a drain coupled to the drain of the fourteenth transistor;
a source; and
a gate coupled to the gate of the fifteenth transistor; and
a seventeenth transistor comprising:
a drain coupled to the source of the sixteenth transistor;
a source coupled to the ground terminal; and
a gate coupled to the drain of the sixteenth transistor.

18. The current generator of claim 17, wherein:
the nineteenth transistor, the thirteenth transistor and the fourteenth transistor are P-type transistors; and
the fifteenth transistor, the sixteenth transistor and the seventeenth transistor are N-type transistors.

19. The current generator of claim 18, wherein the bias generator circuit further comprises:
an eighteenth transistor comprising:
a source configured to receive the supply voltage;
a drain; and
a gate coupled to the drain of the eighteenth transistor;
a nineteenth transistor comprising:
a drain coupled to the drain of the eighteenth transistor;
a source; and
a gate coupled to the gate of the sixteenth transistor; and
a twentieth transistor comprising:
a drain coupled to the source of the nineteenth transistor;
a source coupled to the ground terminal; and
a gate coupled to the gate of the seventeenth transistor.

20. The current generator of claim 19, wherein the eighteenth transistor is a P-type transistor, and the nineteenth transistor and the twentieth transistor are N-type transistors.

* * * * *